(12) United States Patent
Park et al.

(10) Patent No.: US 9,622,186 B2
(45) Date of Patent: Apr. 11, 2017

(54) UPLINK POWER CONTROL METHOD, USER EQUIPMENT, AND BASE STATION

(75) Inventors: Sungho Park, Anyang-si (KR); Binchul Ihm, Anyang-si (KR); Sunam Kim, Anyang-si (KR); Jinyoung Chun, Anyang-si (KR); Jiwon Kang, Anyang-si (KR); Kitae Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 344 days.

(21) Appl. No.: 13/981,944

(22) PCT Filed: Jan. 27, 2012

(86) PCT No.: PCT/KR2012/000628
§ 371 (c)(1),
(2), (4) Date: Oct. 8, 2013

(87) PCT Pub. No.: WO2012/102569
PCT Pub. Date: Aug. 2, 2012

(65) Prior Publication Data
US 2014/0022961 A1    Jan. 23, 2014

Related U.S. Application Data

(60) Provisional application No. 61/436,960, filed on Jan. 27, 2011, provisional application No. 61/484,640, filed on May 10, 2011.

(51) Int. Cl.
*H04W 52/18* (2009.01)
*H04W 52/14* (2009.01)
(Continued)

(52) U.S. Cl.
CPC ......... *H04W 52/18* (2013.01); *H04W 52/146* (2013.01); *H04W 52/243* (2013.01); *H04W 52/10* (2013.01)

(58) Field of Classification Search
CPC .................................................. H04W 52/146
See application file for complete search history.

(56) References Cited

U.S. PATENT DOCUMENTS

2004/0166888 A1\* 8/2004 Ahn ...................... H04W 52/40
455/522
2008/0075032 A1\* 3/2008 Balachandran ....... H04W 72/04
370/317
(Continued)

FOREIGN PATENT DOCUMENTS

KR    10-2008-0045330 A    5/2008
KR    10-2008-0063023 A    7/2008
(Continued)

OTHER PUBLICATIONS

International Search Report issued in corresponding International Patent Application No. PCT/KR2012/000628 dated Sep. 27, 2012.
(Continued)

*Primary Examiner* — Huy D Vu
*Assistant Examiner* — Bao G Nguyen
(74) *Attorney, Agent, or Firm* — Morgan, Lewis & Bockius LLP

(57) ABSTRACT

Provided is a method for mitigating inter-cell interference generated by the collision of UL transmissions and DL transmissions between adjacent cells in an asymmetric time division duplex (TDD) communication system. The present invention removes or reduces time-frequency resources for UL transmissions which collide with DL transmissions of an adjacent cell, and thus can mitigate inter-cell interference.

12 Claims, 10 Drawing Sheets

(51) Int. Cl.
*H04W 52/24* (2009.01)
*H04W 52/10* (2009.01)

(56) References Cited

U.S. PATENT DOCUMENTS

| | | | |
|---|---|---|---|
| 2008/0207192 A1* | 8/2008 | Chu | H04W 40/26 |
| | | | 455/422.1 |
| 2010/0111005 A1 | 5/2010 | Ahn et al. | |
| 2010/0226305 A1 | 9/2010 | Jang | |
| 2012/0100883 A1* | 4/2012 | Hwang | H04W 52/04 |
| | | | 455/522 |

FOREIGN PATENT DOCUMENTS

| | | |
|---|---|---|
| KR | 10-2010-0013764 A | 2/2010 |
| KR | 10-2010-0099847 A | 9/2010 |

OTHER PUBLICATIONS

Written Opinion and International Search Report issued in corresponding International Patent Application No. PCT/KR2012/000628 dated Sep. 27, 2012.

* cited by examiner

UPLINK POWER CONTROL METHOD, USER EQUIPMENT, AND BASE STATION

This is a U.S. National Phase Entry of PCT Application No. PCT/KR2012/000628 filed Jan. 27, 2012, and claims the benefit of U.S. Provisional Application Nos. 61/484,640; and 61/436,960 filed May 10, 2011, and Jan. 27, 2011, respectively.

TECHNICAL FIELD

The present invention relates to a method and apparatus for uplink (UL) transmission power control, and more particularly to a method for reducing inter-cell interference by collision between UL transmission and downlink (DL) transmission in neighbor cells in an asymmetric Time Division Duplex (TDD) communication system.

BACKGROUND ART

Some physical layer (PHY) standards in wireless communication system defines a structures data sequence that has a fixed duration for communication between a user equipment and a base station. The structures data sequence is referred to as frame. One frame includes a specific number of time resource units. A time resource unit may be called a subframe or a slot. One subframe/slot may be configured so as to include a plurality of OFDM symbols in the time domain. For example, one subframe may be constructed of 2 slots, each including 7 OFDM symbols. The number of subframes per frame, the number of slots per subframe, and the number of OFDM symbols per slot are determined according to the physical standard of a corresponding system.

FIG. 1 schematically illustrates three duplex modes used for bidirectional wireless communication.

UL/DL configurations in a frame depend on a duplex mode. The duplex mode means bidirectional communication between two devices, distinguished from simplex which means one-way communication. In duplex communications, transmissions on links in both directions may occur simultaneously (full-duplex) or at mutually exclusive times (half-duplex).

A full-duplex transceiver is used to separate two communication links, which are in opposite directions from each other, in a frequency domain. In other words, different carrier frequencies are used for the respective links, which is referred to as frequency division duplex (FDD). On the contrary, a half-duplex transceiver is used to separate two communication links, which are in opposite directions from each other, in a time domain. A duplex mode in which the same carrier frequency is used for the respective links is referred to as time division duplex (TDD). The half-duplex transceiver may use different carrier frequencies for the two links, which is referred to as half-duplex FDD (HD-FDD). In the HD-FDD mode, communications in opposite directions for specific devices are performed at different instants of time as well as at different carrier frequencies. Accordingly, the HD-FDD mode can be considered as a hybrid of FDD and TDD.

FDD adopted by most communication standards is very efficient for systems having wide frequency bands since it has a paired spectrum. In addition, FDD can dynamically change DL/UL configurations. On the other hand, TDD segments the same frequency band by time to process both DL and UL. While TDD is advantageous to systems which mostly use traffic such as Voice over Internet Protocol (VoIP), it has disadvantages that a geographical area which can be covered by each communication device is smaller than that of FDD and a guard period is needed between a DL period and an UL period due to restrictions on Round Trip Time (RTT). However, TDD can use unpaired spectrum in case of insufficient frequency spectrum. FDD requires a transmitter and a receiver to include a duplexer, a filter, which is capable of separating UL and DL signals transmitted at different carrier frequencies from each other with high accuracy to transmit and receive signals simultaneously. The duplexer causes a certain degree of signal attenuation. This attenuation is generated in a low-noise amplifier on a signal path in the receiver, and thus it directly affects the noise level of the receiver to deteriorate the sensitivity of the receiver. In the case of the transmitter, the duplexer is located behind a power amplification stage on a signal path and requires a high-power amplifier for the power amplification stage in order to overcome or endure the signal attenuation. On the contrary, TDD does not require a transceiver to transmit and receive signals simultaneously, and thus the transceiver can be implemented without a duplexer, simplifying their circuit layouts.

However, a TDD system is allowed to use only one DL/UL frame configuration even though it defines a plurality of DL/UL frame configurations at the system level in order to maintain inter-cell interference between DLs and/or ULs uniform at the network level higher than the system level to reduce system complexity. In other words, while most TDD systems define various DL/UL frame configurations, each BS is restricted from freely configuring DL/UL frames. In 3GPP LTE system, for example, one network cannot have different DL/UL subframe configurations, and thus only one DL/UL subframe configuration is used on a network in which neighboring cells are organically linked to each other. A TDD system in which BSs have the same DL/UL subframe/frame configuration in the same network, as described above, is called a symmetric TDD system.

DISCLOSURE

Technical Problem

The symmetric TDD system deteriorates flexibility of frame/subframe configuration, thus restricting efficient utilization of radio resources and preventing proper reflection of a data loading characteristic difference between BSs in the system. Therefore, recent communication standards have sought solution to support an asymmetric TDD system which permits BSs to use different DL/UL subframe configurations. In the asymmetric TDD system inter-cell interference is not uniform in the time domain, distinguished from the symmetric TDD system.

Therefore, a new scheme of relieving inter-cell interference in the asymmetric system is needed.

It is to be understood that objects to be achieved by the present invention are not limited to the aforementioned objects and other objects which are not mentioned will be apparent to those of ordinary skill in the art to which the present invention pertains from the following description.

Technical Solution

The object of the present invention can be achieved by providing an uplink power control method for use in a user equipment (UE) of a Time Division Duplex (TDD) system comprises: receiving, from a base station (BS), uplink (UL) power control information for a UL channel and information indicating at least one of first and second time durations in which the UL channel is transmitted; and determining first transmission (Tx) power of the first time duration and second transmission (Tx) power of the second time duration using the UL power control information, wherein the UL power control information includes a first parameter used to determine the first Tx power and a second parameter used to determine the second Tx power.

In accordance with another aspect of the present invention, an uplink power control method for use in a base station (BS) of a Time Division Duplex (TDD) system comprises: transmitting, to a user equipment (UE), uplink (UL) power control information for an uplink channel and information indicating at least one of first and second time durations in which the UL channel is transmitted; and receiving the UL channel transmitted by the user equipment (UE) at first transmission (Tx) power during the first time duration and at second transmission (Tx) power during the second time duration, wherein the UL power control information includes a first parameter used to determine the first Tx power and a second parameter used to determine the second Tx power.

In accordance with another aspect of the present invention, a user equipment (UE) for use in a Time Division Duplex (TDD) system comprises: a transmitter, a receiver, and a processor configured to control the transmitter and the receiver, wherein the processor controls the receiver to receive, from a base station (BS), uplink (UL) power control information for an uplink channel and information indicating at least one of first and second time durations in which the UL channel is transmitted; and determines first transmission (Tx) power of the first time duration and second transmission (Tx) power of the second time duration using the UL power control information, where the UL power control information includes a first parameter used to determine the first Tx power and a second parameter used to determine the second Tx power.

In accordance with another aspect of the present invention, a base station (BS) for use in a Time Division Duplex (TDD) system comprises: a transmitter, a receiver, and a processor configured to control the transmitter and the receiver, wherein the processor controls the transmitter to transmit, to a user equipment (UE), uplink (UL) power control information for a UL channel and information indicating at least one of first and second time durations in which the UL channel is transmitted; and receives the UL channel transmitted by the user equipment (UE) at first transmission (Tx) power during the first time duration and at second transmission (Tx) power during the second time duration, wherein the UL power control information includes a first parameter used to determine the first Tx power and a second parameter used to determine the second Tx power.

In each aspect of the present invention, the user equipment (UE) may transmit the UL channel to the base station (BS) at the first Tx power during the first time duration and at the second Tx power during the second time duration.

In each aspect of the present invention, the first parameter for the UL channel (X) may include at least one of $P_{O\_NOMINAL\_X}$ and $P_{O\_UE\_X}$ for the first time duration, and the second parameter for the UL channel (X) may include at least one of $P_{O\_NOMINAL\_X}$ and $P_{O\_UE\_X}$ for the second time duration.

In each aspect of the present invention, the first time duration may be a time duration in which the UL channel functions as interference toward a downlink (DL) control channel.

The aforementioned technical solutions are only a part of the embodiments of the present invention, and various modifications to which technical features of the present invention are applied could be understood by those of ordinary skill in the art to which the present invention pertains, based on the following detailed description of the present invention.

Advantageous Effects

According to embodiments of the present invention, inter-cell interference between neighboring cells can be reduced even though BSs freely configure UL/DL frames/subframes.

In accordance with embodiments, time-frequency resources for UL transmission colliding with DL transmission of a neighbor cell are removed or reduced, resulting in reduction of inter-cell interference between neighbor cells. This improves reliability of uplink and/or downlink transmission so as to enhance throughput of the asymmetric TDD system.

It will be appreciated by persons skilled in the art that the effects that could be achieved with the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
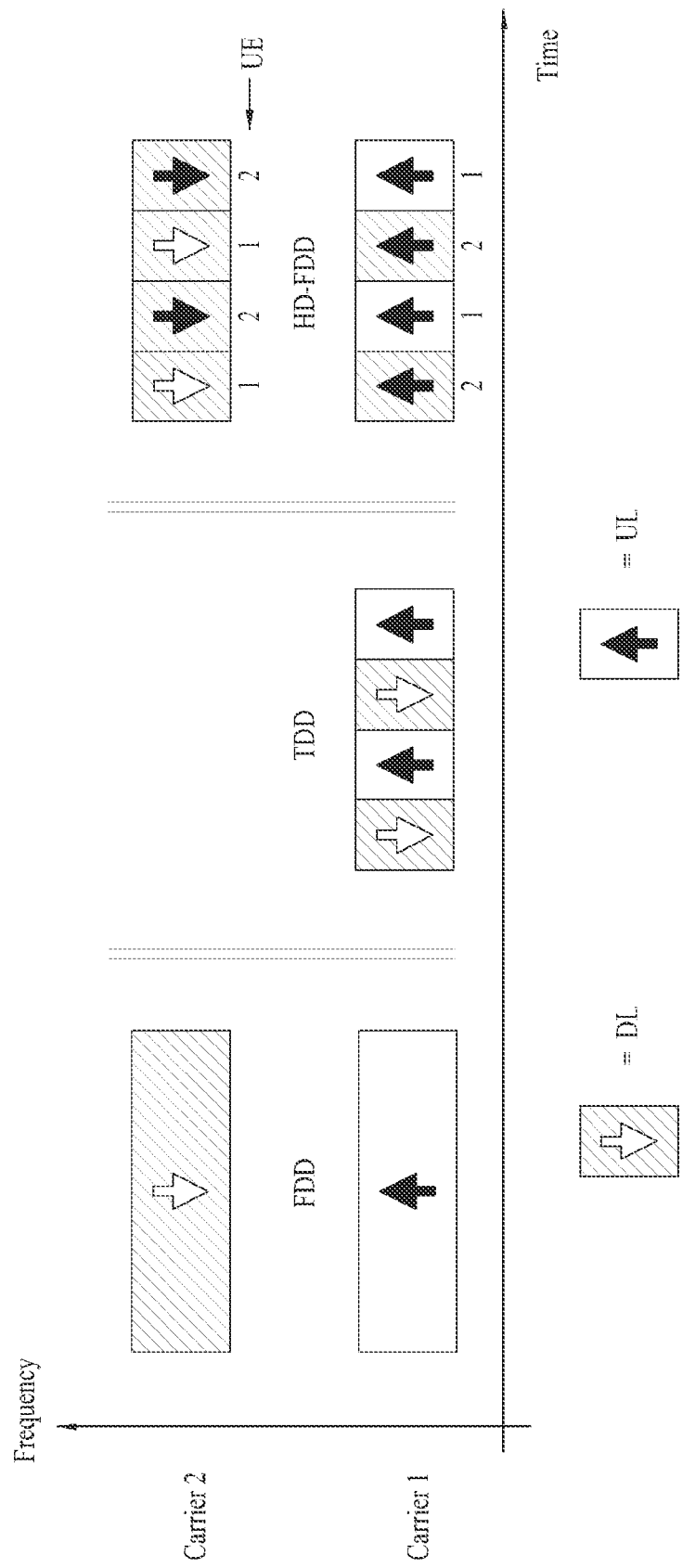
FIG. 1 schematically illustrates three duplex modes used in bidirectional wireless communication.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters.

Techniques, apparatus and systems described herein can be used in various wireless access technologies such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. The CDMA may be implemented with a radio technology such as Universal Terrestrial Radio Access (UTRA) or CDMA2000. The TDMA may be implemented with a radio technology such as Global System for Mobile communications (GSM)/General Packet Radio Service (GPRS)/Enhanced Data Rates for GSM Evolution (EDGE). The OFDMA may be implemented with a radio technology such as institute of electrical and electronics engineers (IEEE) 802.11 (Wi-Fi), IEEE 802.16 (WiMAX), IEEE 802-20, Evolved-UTRA (E-UTRA) etc. The UTRA is a part of a Universal Mobile Telecommunication System (UMTS). 3rd Generation Partnership Project (3GPP) Long Term Evolution (LTE) is a part of an Evolved-UMTS (E-UMTS) using the E-UTRA. The 3GPP LTE employs the OFDMA in downlink (DL) and employs the SC-FDMA in uplink (UL). LTE-Advance (LTE-A) is an evolution of the 3GPP LTE. For clarity, this application focuses on the 3GPP LTE/LTE-A. However, technical features of the present invention are not limited thereto. For example, although the following description will be made based on a mobile communication system corresponding to a 3GPP LTE/LTE-A system, the following description can be applied to other mobile communication systems except unique features of the 3GPP LTE/LTE-A system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a User Equipment (UE) denotes a mobile or fixed type user terminal Examples of the UE include various equipments that transmit and receive user data and/or various kinds of control information to and from a base station. The UE may be referred to as, a Terminal Equipment (TE), a Mobile Station (MS), a Mobile Terminal (MT), a User Terminal (UT), a Subscriber Station (SS), a wireless device, a Personal Digital Assistant (PDA), a wireless modem, or a handheld device. Also, in the present invention, a Base Station (BS) means a fixed station that performs communication with a user equipment and/or another base station, and exchanges various kinds of data and control information with the user equipment and another base station. The base station may be referred to another terminology such as an Evolved-NodeB (eNB), a Base Transceiver System (BTS), and an Access Point (AP).

In the present invention, the term CELL refers to a geographical region to which a BS or an antenna group provides a communication service. Thus, when it is said that a UE communicates with a specific cell, it means that the UE communicates with a BS, an antenna or an antenna group that provides a communication service to the specific cell. The term DOWNLINK/UPLINK SIGNAL OF A SPECIFIC CELL refers to a downlink/uplink signal with respect to a BS, an antenna or an antenna group that provides a communication service to the specific cell. The term CHANNEL STATE/QUALITY OF A SPECIFIC CELL refers to a channel state/quality of a communication link or a channel established between a UE and an antenna group that provides a communication service to the specific cell. DL channel state/quality may be measured using a channel measurement reference signal (RS) which is transmitted from the corresponding cell over the entire band. In order to allow neighbor cells in a multi-cell system to transmit the channel measurement RSs using different time-frequency resources, sets of time-frequency resources capable of carrying reference signals (RSs) within a predetermined resource region defined by a plurality of time-frequency resources. A user equipment (UE) may measure a channel state or interference using a specific set of time-frequency resources indicated by a base station (BS), and may also measure a channel state of a cell corresponding to the specific set of time-frequency resources and/or interference applied to the cell corresponding to the specific set of time-frequency resources.

In the present invention, the term INTERFERING CELL refers to a cell that interferes with a specific cell. When a signal of a neighbor cell interferes with a signal of a specific cell, the neighbor cell corresponds to an interfering cell and the specific cell corresponds to a victim cell. When neighboring cells interfere each other or unilaterally, this interference is referred to as inter-cell interference (ICI). The interfering cell and the victim cell may belong to the same BS, or may also belong to different base stations (BSs). For convenience of description and better understanding of the present invention, it is assumed that the interfering cell and the victim cell belong to different BSs. However, the embodiments of the present invention may also be applied to other cases in which the interfering cell and the victim cell belong to the same BS. If the interfering cell and the victim cell belong to the same BS, information exchange between a BS of the victim cell and a BS of the interfering cell may be omitted.

In the present invention, when it is said that a specific signal is allocated to a frame, subframe, slot, carrier, or subcarrier, this means that the specific signal is transmitted through the carrier or subcarrier during a period or timing of the frame, subframe, slot, or symbol.

In the present invention, a Physical Downlink Control Channel (PDCCH), a Physical Control Format Indicator Channel (PCFICH), a Physical Hybrid automatic retransmit request Indicator Channel (PHICH), and a Physical Downlink Shared CHannel (PDSCH) may indicate a set of time-frequency resources or resource elements (REs) carrying Downlink Control Information (DCI), a set of time-frequency resources or REs carrying Control Format Indicator (CFI), a set of time-frequency resources or REs carrying downlink ACK/NACK (ACKnowlegement/Negative ACK), and a set of time-frequency resources or REs carrying DL data, respectively. In addition, a Physical Uplink Control CHannel (PUCCH), a Physical Uplink Shared CHannel (PUSCH), and a Physical Random Access CHannel) (PRACH) may indicate a set of time-frequency resources or REs carrying Uplink Control Information (UCI), a set of time-frequency resources or REs carrying UL data, and a set of time-frequency resources REs carrying a random access signal, respectively. In the present invention, time-frequency resource or RE that is assigned to or pertains to PDCCH/PCFICH/PHICH/PDSCH/PUCCH/PUSCH/PRACH may be called PDCCH/PCFICH/PHICH/PDSCH/PUCCH/PUSCH/PRACH RE or PDCCH/PCFICH/PHICH/PDSCH/PUCCH/PUSCH/PRACH resource.

Therefore, in the present invention, PUCCH/PUSCH/PRACH transmission of a UE may be conceptually identical to UL control information/UL data/random access signal transmission on PUSCH/PUCCH/PRACH, respectively. In addition, PDCCH/PCFICH/PHICH/PDSCH transmission of a BS may be conceptually identical to DL data/control information transmission on PDCCH/PCFICH/PHICH/PDSCH, respectively.

Figure 2:
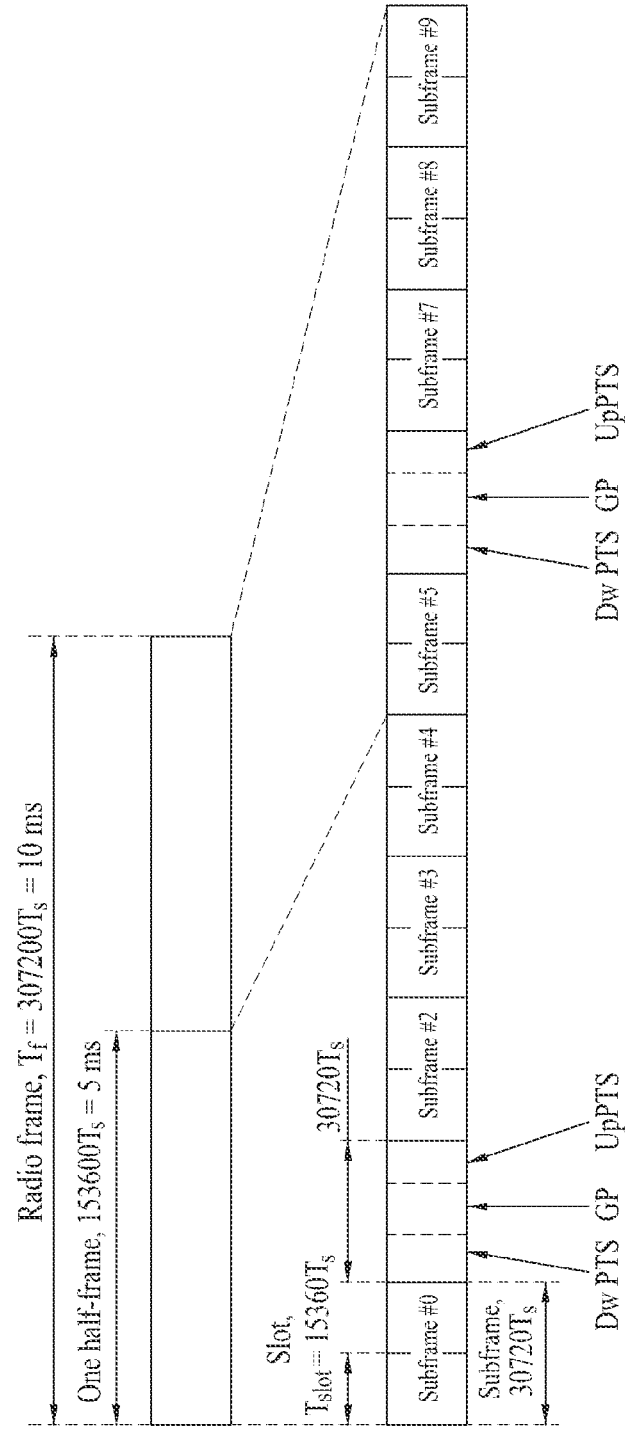
FIG. 2 illustrates a TDD frame structure.

FIG. 2 illustrates an exemplary structure of a radio frame for TDD. Particularly, FIG. 2 illustrates a TDD frame structures used in 3GPP LTE(-A).

Referring to FIG. 2, a 3GPP LTE/LTE-A radio frame is 10 ms (307,200 $T_s$) in duration. The radio frame is divided into 10 equally-sized subframes. Subframe numbers may be assigned to the 10 subframes within the radio frame, respectively. $T_s$ denotes sampling time, where $T_s=1/(2048\times15$ kHz). Each subframe is 1 ms long and further divided into two slots. 20 slots are sequentially numbered from 0 to 19 in a radio frame. Duration of each slot is 0.5 ms. A time interval in which one subframe is transmitted is defined as a Transmission Time Interval (TTI). Time resources may be distinguished by a radio frame number (or radio frame index), a subframe number (or subframe index), a slot number (or slot index), and the like.

In the TDD mode, DL transmission and UL transmission are discriminated according to time, such that subframes contained in a frame may be classified into DL subframes and UL subframes. Table 1 shows an exemplary UL-DL configuration in a TDD mode.

Figure 3:
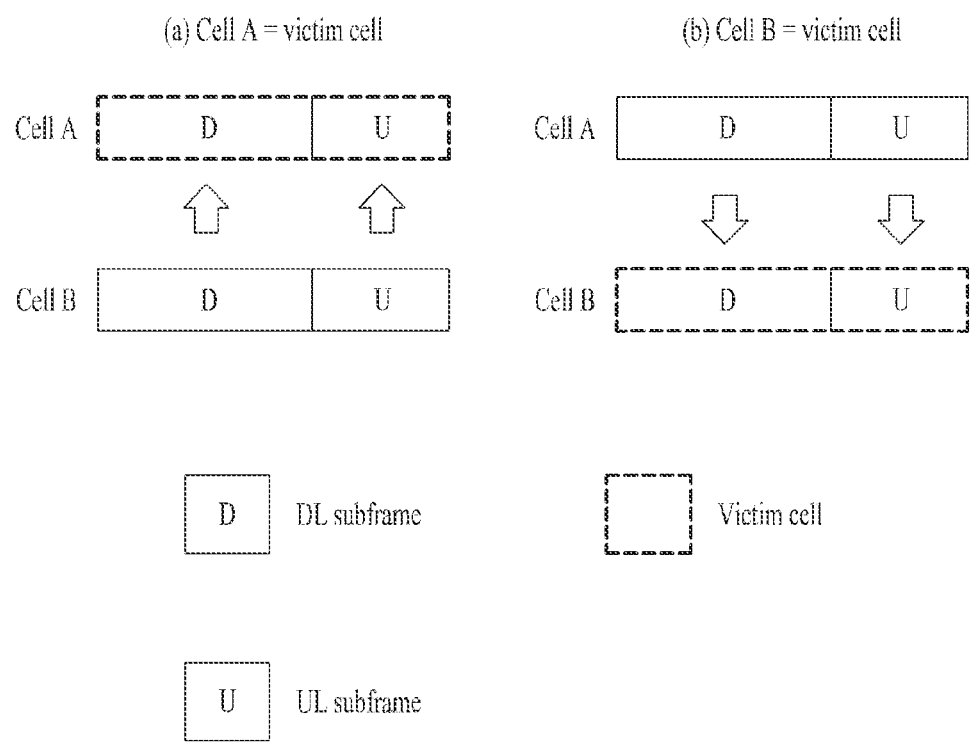
FIG. 3 illustrates the relationship between a victim cell and an interfering cell in a general symmetric TDD system.

FIG. 3 shows the relationship between a victim cell and an interfering cell in a general symmetric TDD system. In FIG. 3(a), cell B serves as an interfering cell and interferes with cell A serving as a victim cell. In FIG. 3(b), cell A serves as an interfering cell and interferes with the victim cell B.

Referring to FIG. 3, in the symmetric TDD system in which BSs belonging to the same network have to use the same DL/UL configuration, only interference between DLs and/or between ULs exist between neighboring cells.

Accordingly, if the influence of loading at each BS is not considered in the symmetric TDD system, for example, if BSs using the same band perform full loading to allocate signals to all radio resources, ICI occurs uniformly in the time domain on DLs and ULs of cells. In this case, each BS can assume uniform ICI in the time domain. However, the symmetric TDD system deteriorates efficient utilization of

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D is a DL subframe, U is a UL subframe, and S is a special subframe. The special subframe denoted by S may include three fields, i.e., Downlink Pilot TimeSlot (DwPTS), Guard Period (GP), and Uplink Pilot TimeSlot (UpPTS). DwPTS is a time period reserved for DL transmission, and UpPTS is a time period reserved for UL transmission. Table 2 shows an exemplary special frame configuration.

resources and does not effectively reflect data loading characteristics of BSs. Accordingly, recent communication standards have attempted to support the asymmetric TDD which can allow BSs to have different DL/UL configurations. When BSs can have different DL/UL configurations, neighboring cells can also have different DL/UL configurations. In this case, interference between the neighboring cells may differ from that in the symmetric TDD system.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | | |
| 5 | 6592 · $T_s$ | 4384 · $T_s$ | 5120 · $T_s$ | 20480 · $T_s$ | 4384 · $T_s$ | 5120 · $T_s$ |
| 6 | 19760 · $T_s$ | | | 23040 · $T_s$ | | |
| 7 | 21952 · $T_s$ | | | — | — | — |
| 8 | 24144 · $T_s$ | | | — | — | — |

Referring to Tables 1 and 2, the 3GPP LTE(-A) system defines various DL/UL configurations. However, since most communication standards so far do not allow the asymmetric TDD, BSs belonging to one network cannot have different DL/UL configurations. That is, communication systems conforming to the standards so far allow only the symmetric TDD in which BSs belonging to the same network communicate with UEs using the same DL/UL configuration.

Figure 4:
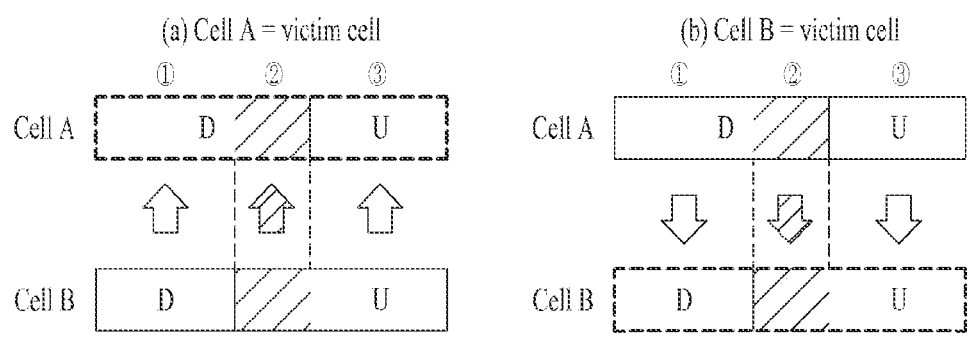
FIG. 4 illustrates the relationship between a victim cell and an interfering cell in a general asymmetric TDD system.

FIG. 4 shows the relationship between a victim cell and an interfering cell in an asymmetric TDD system.

Referring to FIG. 4, in the asymmetric TDD system in which BSs using the same band can have different DL/UL configurations, respective cells have different interference forms, resulting in various problems that are not generated in the symmetric TDD system. For instance, distinguished from the symmetric TDD system having only interference between DLs or interference between ULs, interference from UL to DL as shown in of FIG. 4(a) or interference from DL to UL as shown in of FIG. 4(b) also exists between neighboring cells in the asymmetric system. Further, since cells may have different DL/UL subframe configurations in a frame, locations of DL/UL control channels may vary in subframes in the asymmetric TDD system, distinguished from the symmetric TDD system in which the locations of the DL/UL control channels are fixed throughout the subframes. This generates additional ICI between DL/UL control channels. In general, a control channel carries information with high significance between a BS and a UE. Particularly, since an area in which a DL control channel transmitted by a BS can be successfully received is generally assumed to be service coverage of the corresponding cell, a range in which the DL control channel can be received is recognized as a measure of service. Therefore, it is very important to correctly transmit control information from a BS to a UE or from the UE to the BS for improvement of communication quality and data throughput. For accuracy of transmission of control information, the BS and the UE use/allocate higher power than that allocated to data channels carrying data for/to control channels. Accordingly, control channels may cause significant interference each other on a time-frequency resource in which they are overlapped.

That is, an interference amount in each cell is different in DL and UL in a communication system including an asymmetric TDD DL/UL configuration. The interference amount in the victim cell and the interference amount in the interfering cell will hereinafter be described with reference to FIGS. 5 and 6.

Figure 5:
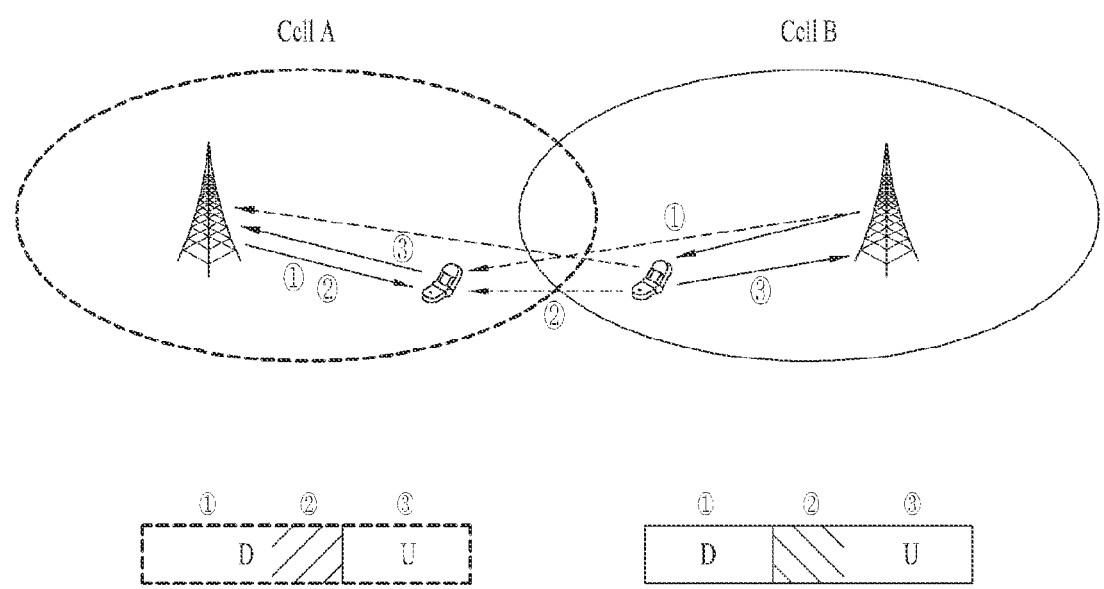
FIG. 5 is a conceptual diagram illustrating that a UE located in Cell A receives DL/UL inter-cell interference from Cell B acting as an interfering cell on the condition that Cell A is a victim cell.

FIG. 5 is a conceptual diagram illustrating that a UE located in Cell A receives DL/UL inter-cell interference from Cell B acting as an interfering cell on the condition that Cell A is a victim cell.

Referring to FIG. 5, Sections and are DL subframes of Cell A, and Section is a UL subframe of Cell A. Whereas ICI occurs in Section related to a UE of Cell A by DL transmission of Cell B, ICI may occur in Section by UL transmission from a UE of Cell B instead of by DL transmission for a UE of Cell B. That is, although the same DL transmission by Cell A is used, the same DL transmission may experience ICI having different characteristics in Sections and. Especially, ICI in Section may cause higher interference to DL transmission for a UE of Cell A according to a distance from the UE of Cell A to a UE of Cell B, as compared to ICI in Section.

In the meantime, Section corresponds to a UL subframe of Cell A, and a UE of Cell B performs UL transmission for a BS of Cell B while a UE of Cell A performs UL transmission for a BS of Cell A. Therefore, ICI may be assumed in the same manner as in the symmetric TDD configuration in the section.

Hereinafter, a time duration in which all BSs commonly perform DL transmission as shown in the section of FIG. 5 is referred to as a DL homogeneous time duration, and a time duration in which a home BS (i.e., a serving BS) of the victim cell performs DL transmission and other BSs perform link transmission other than DL link transmission is referred to as a DL heterogeneous time duration. In addition, a time duration in which all BSs commonly perform UL transmission as shown in the section of FIG. 5 is hereinafter referred to as a UL homogeneous time duration. For example, a subframe/slot/symbol in which all BSs causing mutual interference commonly perform DL transmission is referred to as a DL homogeneous subframe/slot/symbol, a subframe/slot/symbol in which BSs causing mutual interference performs transmission in different directions is referred to as a DL heterogeneous subframe/slot/symbol, and a subframe/slot/symbol in which all BSs causing mutual interference commonly perform UL transmission is referred to as a UL homogeneous subframe/slot/slot.

Figure 6:
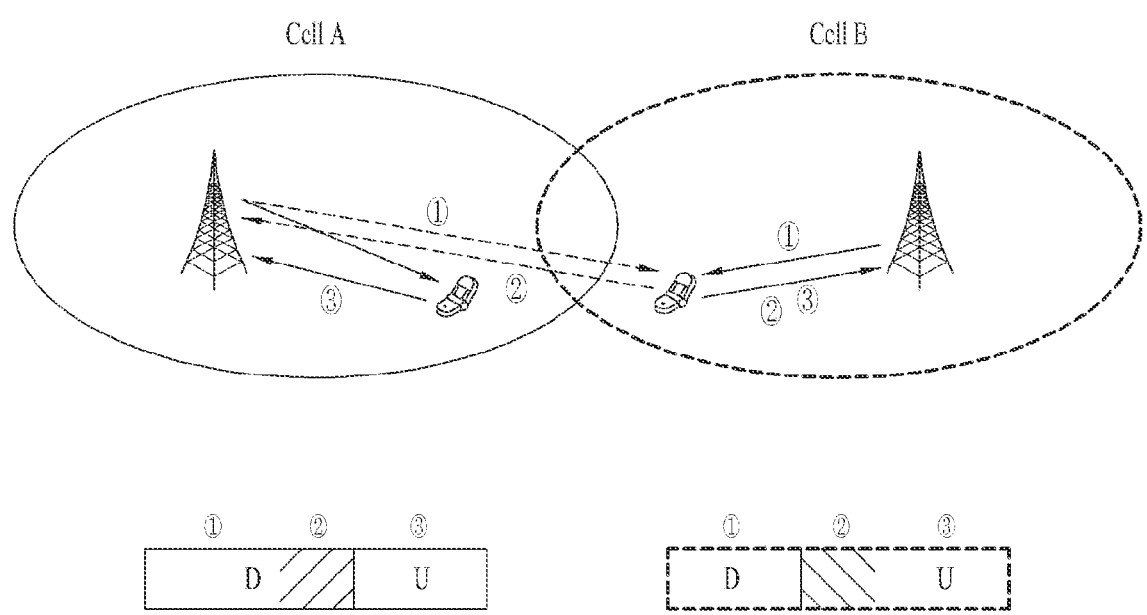
FIG. 6 is a conceptual diagram illustrating that a UE located in Cell B receives DL/UL inter-cell interference from Cell A acting as an interfering cell on the condition that Cell B is a victim cell.

FIG. 6 is a conceptual diagram illustrating that a UE located in Cell B receives DL/UL inter-cell interference from Cell A acting as an interfering cell on the condition that Cell B is a victim cell.

On the contrary to FIG. 5, FIG. 6 shows the case in which Cell B functions as the victim cell and Cell A functions as an interfering cell. Referring to FIG. 6, DL transmission from a UE of the cell A by the BS of the cell B is carried out in the section. In the section, the BS of the cell A also performs DL transmission for the UE of the cell A. Therefore, ICI may be assumed in the same manner as in the symmetric TDD configuration.

Meanwhile, whereas UL transmission by a UE of the cell B is carried out in the sections and, UL transmission by the UE of the cell A is carried out only in the section. That is, the amount of correct ICI information is insufficient since, in the section from among the UL transmission sections and of the cell B, UL transmission of the cell B experiences interference by DL transmission. It is because only ICI by UL and UL, or only ICI by DL and DL in the symmetric TDD configuration is considered. Therefore, in the section from among the UL transmission sections of the cell B, it is difficult to determine correct channel state information (CSI) such as CQI, PMI, or RI. Moreover, in case of UL, power control is carried out on the basis of a DL path loss and UL Noise and Interference (NI). It is impossible to guarantee UL power control throughput since, differently from the above case of using the section, NI is changed to another NI in the case of using the section ②. Accordingly, a new power control method for configuring the asymmetric TDD configuration is needed.

The legacy interference reduction method can be used without change since interference between DL and DL and interference between UL and UL are present in the legacy asymmetric TDD system. However, interference between DL and DL or interference between UL and DL occurs newly due to the asymmetric TDD system. Therefore, a method for reducing such interference is needed.

For reference, although ICI may occur between cells managed by the same BS, the embodiments will hereinafter be described on the assumption that different cells are controlled by different BSs for convenience of description. However, assuming that cells controlled by the same BS are configured to use a frame structure having different UL/DL configurations in the corresponding cells, the embodiments of the present invention can be applied to the corresponding cells. Meanwhile, according to the embodiments, a BS to which a UE is connected is referred to as a serving BS, and a geographical region in which the serving BS supports the UE is referred to as a serving cell. In addition, a specific cell, which is located close to the serving cell, affects UL/DL signals of the serving cell, or receives influence from the UL/DL signals, is referred to as a neighbor cell, and a BS for controlling the neighbor cell is referred to as a neighbor BS.

If the serving BS performs DL transmission in the asymmetric TDD system, throughput deterioration may occur by UL interference from the neighbor BS. Alternatively, if the serving BS performs UL transmission, throughput deterioration may occur by DL interference from the neighbor BS. Interference between neighbor cells may be handled from the viewpoint of collision between a control region and a data region. That is, interference categories generated between the victim cell and the interfering cell may be classified into the following four interference types.

Type 1) Interference between control channels
Type 2) Interference between a control channel of the victim cell and a data channel of the interfering cell.
Type 3) Interference between a data channel of the victim cell and a control channel of the interfering cell
Type 4) Interference between data channels From among the above four interference types, Type 1 has the highest power of influence affecting system throughput deterioration, and the power of influence is gradually reduced in the order of Type 1→Type 2→Type 3→Type 4, such that Type 4 has the lowest power of influence. Hereinafter, interference generated between control channels and the interference reduction method will hereinafter be described with reference to control channels of 3GPP LTE (-A).

Figure 7:
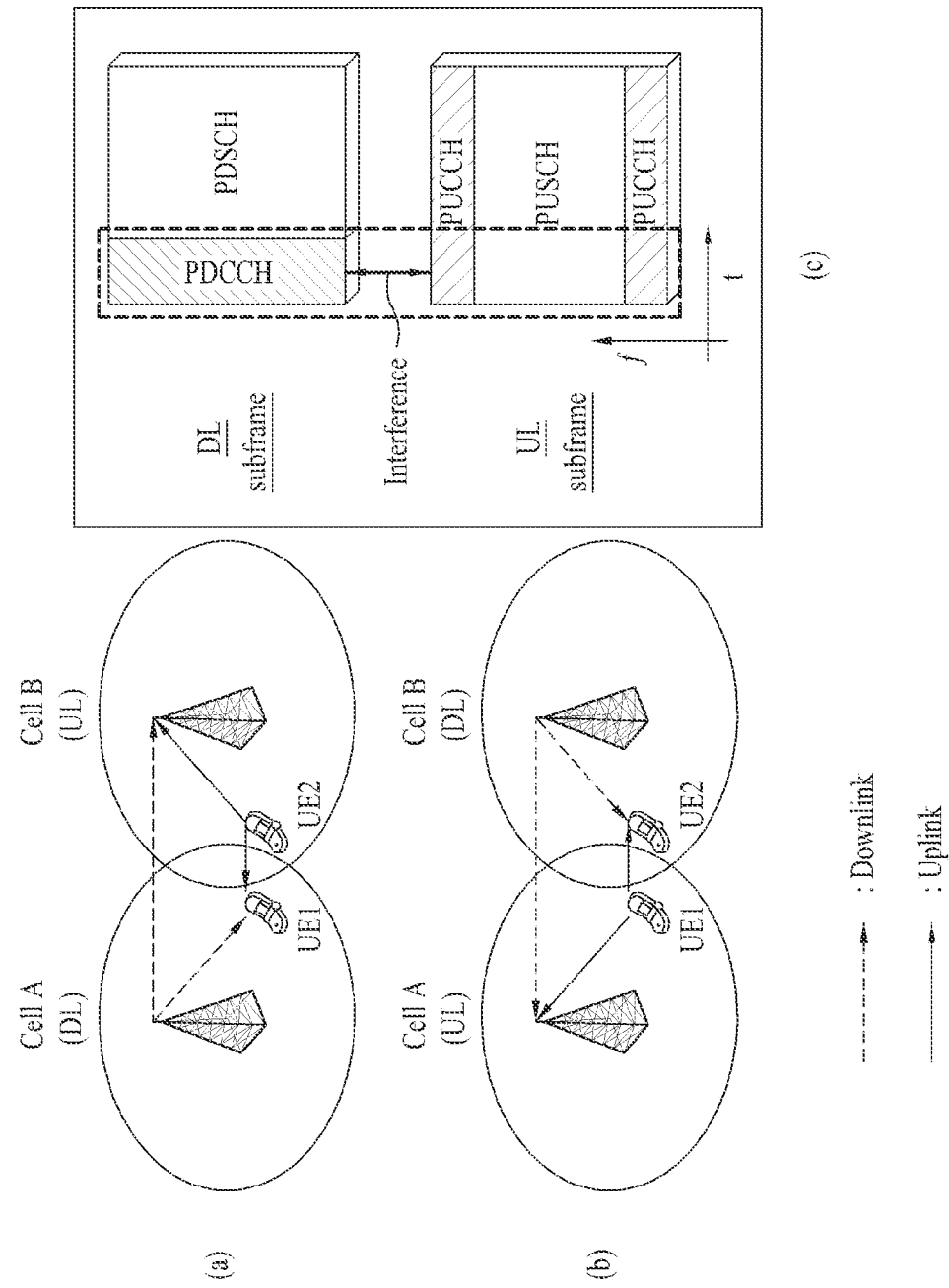
FIG. 7 is a conceptual diagram illustrating that ICI generated between a DL subframe and a UL subframe transmitted from different cells in a 3GPP LTE(-A) TDD system.

FIG. 7 is a conceptual diagram illustrating that ICI generated between a DL subframe and a UL subframe transmitted from different cells in the 3GPP LTE(-A) TDD system.

The DL subframe and the UL subframe of the 3GPP LTE(-A) system will hereinafter be described with reference to FIG. 7(c). Referring to FIG. 7, each subframe may be divided into a control region and a data region. The control region includes one or more OFDM symbols, starting from the first OFDM symbol. In a DL subframe in the 3GPP LTE(-A) system, the control region is set to a region in which a PDCCH (Physical Downlink Control Channel) may be transmitted, and thus the control region in a DL subframe may be referred to as a PDCCH region. The number of OFDM symbols used for the control region of a DL subframe may be set independently on a subframe basis and signaled on a PCFICH (Physical Control Format Indicator CHannel). A BS may transmit control information to a UE or UEs in the control region. To transmit control information, a PDCCH, a PCFICH, a PHICH (Physical Hybrid automatic retransmit request Indicator CHannel), etc. may be allocated to the control region. The BS may transmit data to a UE or UE group in the data region. Data transmitted in the data region is referred to as user data. A PDSCH (Physical Downlink Shared CHannel) may be allocated to the data region to convey user data. Therefore, the control region in a DL subframe may be referred to as a PDSCH region.

In the meantime, UL subframe according to the 3GPP LTE(-A) may be divided into a data region and a control region in the frequency domain. In a UL subframe, subcarriers distant from a DC (Direct Current) subcarrier may be used as a control region. In other words, subcarriers located at both ends of a UL transmission bandwidth are assigned to UL control information transmission. DC subcarriers are reserved without being used in signal transmission, and are mapped to a carrier frequency ($f_0$) in a frequency upconversion process caused by the OFDM signal generator. One or more Physical Uplink Control CHannels (PUCCHs) may be allocated to the control region to deliver Uplink Control Information (UCI). Therefore, the control region in a DL subframe may be referred to as a PUCCH region. A PUCCH used for the UE to transmit UCI is allocated by the BS and signaled to the UE implicitly or explicitly. One or more Physical Uplink Shared Channels (PUSCHs) may be allocated to the data region to deliver user data. Therefore, the control region in a DL subframe may be referred to as a PUSCH region. A PUSCH used for the UE to transmit user data is allocated by the BS and signaled to the UE through a PDCCH delivered to the UE.

Referring to FIG. 7(a), a DL signal received from the cell A by UE1 located at an edge of the cell A may receive interference by a UL signal transmitted to the cell B of UE2 located close to the UE1. Referring to FIG. 7(b), interference caused by a UL signal transmitted to the cell B by UE1 may receive interference by a DL signal received from the cell B by the UE2 although interference caused by a DL signal of the UE1 is relatively lower than interference caused by a UL signal of the UE2.

Referring to FIG. 7(a), collision between all or some of control channels of neighbor cells may cause some problems according to the DL/UL subframe configuration. Control channels generally use high transmission power since successful transmission of control channels is directly related to service coverage of the corresponding UE/BS. Therefore, high interference occurs between a DL control channel and a UL control channel. Thus, DL/UL control channels of a UE located at a cell edge may receive high interference from UL/DL control channels of another neighbor cell. In the heterogeneous time duration in which different types of inter-cell interference (ICI) coexist, collision between a DL control channel and a UL control channel may cause serious system throughput. Specifically, collision between PDCCH and PUCCH may greatly affect system throughput deterioration because each of PDCCH and PUCCH may carry control information of DL data transmission and UL data transmission. Since a DL control channel carries cell-specific control (system) information, the necessity of protecting the DL control channel is relatively higher than the necessity of protecting a UL control channel.

Therefore, a method for reducing such collision needs to be proposed since collision between a DL/UL control channel of the victim cell and a UL/DL control channel of the interfering cell occurs newly due to the asymmetric TDD system.

A method for avoiding collision between a DL control channel and a UL control channel using the legacy system without change needs to be devised. However, if each BS for use in the legacy system configures a TDD DL/UL structure, it is very difficult to prevent collision between DL and UL control channels of the legacy system since BSs do not change this configuration. In addition, it is very difficult to change the structure of a legacy control channel since the structure of each control channel has many elements connected to a higher layer such as RRC layer, etc.

Therefore, the embodiments of the present invention provide a method for limiting transmission (Tx) power of a UL control channel and/or a UL data channel of the interfering cell so as to reduce interference between control channels of neighbor cells under the asymmetric TDD environment. The embodiments will hereinafter be described with reference to the 3GPP LTE(-A) system.

First of all, transmission (Tx) power of PUSCH and PUCCH for use in the 3GPP LTE-A system will hereinafter be described with reference to Equations 1 to 3. For reference, as can be seen from the following equations 1 to 3, it should be noted that a (serving) cell (c) is used in a different way from an interfering cell or a victim cell. In Equations 1 to 3, the (serving) cell (c) indicates a group of DL time-frequency resources and/or a group of UL time-frequency resources. From the viewpoint of time-frequency resources, a center frequency of the (serving) cell (c) is referred to as a carrier frequency. The technology for using a higher UL/DL bandwidth by aggregating a plurality of UL/DL frequency blocks is referred to as the carrier aggregation (CA) technology. In the system supporting carrier aggregation (CA), the serving cell (c) may be classified into a primary cell (PCell) and a secondary cell (SCell). A frequency at which a UE from among the serving cell(s) performs an initial connection establishment process or a frequency at which a UE from among the serving cell(s) performs a connection re-establishment process is referred to as a primary frequency or a primary component carrier (CC), and a cell operating in the primary frequency is referred to as a primary cell (PCell). PCell may indicate a specific cell designated in a handover process. A frequency configured after completion of RRC connection establishment and used to provide additional radio resources is referred to as a secondary frequency or a secondary CC, and a specific cell operating in the secondary frequency is a secondary cell (SCell).

Assuming that only a PUSCH is transmitted without using a PUCCH simultaneously transmitted in the serving cell (c), transmission (Tx) power $P_{PUSCH,c}(i)$ at the subframe (i) for the serving cell (c) is determined by a UE as represented by the following equation 1.

$$P_{PUSCH,c}(i) = \min \begin{cases} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{cases}$$ [Equation 1]

Assuming that PUCCH and PUSCH are simultaneously transmitted in the serving cell (c), transmission (Tx) power $P_{PUSCH,c}(i)$ at the subframe (i) for the serving cell (c) is determined by a UE as represented by the following equation 2.

$$P_{PUSCH,c}(i) = \min \begin{cases} 10\log_{10}(P'_{CMAX,c}(i) - P'_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{cases}$$ [Equation 2]

In Equation 1 and Equation 2, a unit of the transmission (Tx) power $P_{PUSCH,c}(i)$ is denoted by dBm. In Equations 1 and 2, (i) may indicate a time index (or a subframe index). $P_{CMAX,c}(i)$ may indicate UL transmission power configured in the subframe (i) for the serving cell (c), and $P'_{CMAX,c}(i)$ is a linear value of the UL transmission power $P_{CMAX,c}(i)$. $P'_{PUCCH}(i)$ is a linear value of $P_{PUCCH}(i)$ determined by Equation 3. $M_{PUSCH,c}(i)$ is a bandwidth for PUSCH resource allocation, and $M_{PUSCH,c}(i)$ is determined on the basis of the subframe (i) and the number of valid resource blocks of the serving cell (c). $\alpha_c(j) \cdot PL_c$ is a parameter for pathloss compensation, where $PL_c$ may indicate a DL pathloss estimation value calculated by a UE on a dB basis in association with the serving cell (c). For example, $PL_c$ may be determined by a specific value obtained when higher-layer-filtered Reference Signal Received Power (RSRP) is deducted from reference signal power (RSP). $\alpha_c(j)$ is a scaling factor for pathloss compensation. In case of j=0 or j=1, $\alpha_c(j)$ may be denoted by $0 \le \alpha_c(j) \le 1$. For example, $\alpha_c$ may be denoted by $\alpha_c \in \{0, 0.4, 0.5, 0.6, 0.7, 0.8, 0.9, 1\}$, and $\alpha_c$ is a 3-bit parameter for the serving cell (c) and may be provided to a higher layer. In case of j=2, $\alpha_c(j)$ may be set to 1 as denoted by $\alpha_c(j)=1$. If $\alpha_c(j)$ is set to 1, this means that pathloss is completely compensated. If $\alpha_c(j)$ is less than 1, this means that passloss is partially compensated. $P_{O\_PUSCH,c}(j)$ is a parameter that corresponds to the sum of a first component $P_{O\_NOMINAL\_PUSCH,c}(j)$ provided from a higher layer in association with j=0 and j=1 and a second component $P_{O\_UE\_PUSCH,c}(j)$ provided from a higher layer in association with j=0 and j=1. In association with PUSCH (re)transmission corresponding to semi-persistent grant, the value of j is set to 0 as denoted by j=0. In association with PUSCH (re)transmission corresponding to a dynamically scheduled grant, the value of j is set to 1 as denoted by j=1. In association with PUSCH (re)transmission corresponding to random access response grant, the value of j is set to 2 as denoted by j=2. $P_{O\_UE\_PUSCH,c}(2)$ may be set to zero (0) as denoted by $P_{O\_UE\_PUSCH,c}(2)=0$, $P_{O\_NOMINAL\_PUSCH,c}(j)$ is identical to $P_{O\_PRE}+\Delta_{PREAMBLE\_Msg3}$ (i.e., $P_{O\_NOMINAL\_PUSCH,c}(j)=P_{O\_PRE}+\Delta_{PREAMBLE\_Msg3}$), and parameters $P_{O\_PRE}$ and $\Delta_{PREAMBLE\_Msg3}$ may be signaled from a higher layer.

$\Delta_{TF,c}(i)$ is decided on the basis of UE-specific values provided from a higher layer. $f_c(i)$ is a UE-specific parameter controlled by a base station (BS), and may be determined by $f_c(i)=f_c(i-1)+\delta_{PUSCH,c}(i-K_{PUSCH})$. Here, $\delta_{PUSCH,c}$ is a UE-specific correction value, and may be referred to as a transmit power control (TPC) command. $\delta_{PUSCH,c}$ may be contained in a PDCCH of DCI format 0/4 for the serving cell (c), or may be joint-coded with other TPC commands at a PDCCH of DCI format 3/3A. For example, $\delta_{PUSCH,c}(i-K_{PUSCH})$ may be signaled through a PDCCH of DCI format 0/4 or 3/3A at the subframe (i-$K_{PUSCH}$). If the accumulation value of $\delta_{PUSCH,c}$ is enabled in the serving cell (c), $f_c(0)$ is a first value obtained after completion of reset of such accumulation. If the accumulation of $\delta_{PUSCH,c}$ is disabled by a higher layer, $f_c(i)$ is identical to $f(i-1)_c$ (i.e., $=f(i-1)_c$). $K_{PUSCH}$ may be predetermined by TDD UL/DL configuration according to FDD and TDD. For example, in case of the FDD, $K_{PUSCH}$ may be set to 4 (i.e., $K_{PUSCH}=4$).

In association with the serving cell (c), the transmission power $P_{PUCCH,c}(i)$ at the subframe (i) may be decided by the following equation 3:

$$P_{PUCCH}(i) = \min \begin{cases} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{cases}$$ [Equation 3]

In Equation 3, a unit of $P_{PUCCH}(i)$ is denoted by dBm, and $P_{CMAX,c}(i)$ and $PL_c$ have the same meaning as in Equations 1 and 2. The parameter $\Delta_{F\_PUCCH}(F)$ may be provided by a higher layer, and each value $\Delta_{F\_PUCCH}(F)$ may correspond to a PUCCH format (F) relative to PUCCH format 1a. Provided that a UE is configured by a higher layer in a manner that PUCCH is transmitted on two antenna ports, $\Delta_{T*D}(F')$ is provided by a higher layer. In other cases, $\Delta_{T*D}(F')$ may be set to zero (i.e., $\Delta_{T*D}(F')=0$). $h(n_{CQI}, n_{HARQ}, n_{SR})$ is a PUCCH format dependent value, and $n_{CQI}$ corresponds to the number of information bits for channel quality information (CQI). If the subframe (i) is configured for scheduling request (SR) for a UE having no associated transmission block for UL-SCH, $n_{SR}$ is set to 1 (i.e., $n_{SR}=1$). Otherwise, $n_{SR}$ is set to zero (i.e., $n_{SR}=0$). If a UE is configured with one serving cell, $H_{HARQ}$ may correspond to the number of HARQ (Hybrid Automatic Repeat request) bits sent from the subframe (i). Otherwise, $H_{HARQ}$ may be determined by a UE procedure for DL control channel assignment. g(i) may indicate a current PUCCH power control adjustment state, and g(0) may indicate a first value after completion of such resetting. In Equation 3, $P_{O\_PUCCH}$ is a parameter indicating the sum of a component $P_{O\_NOMINAL\_PUCCH}$ and a component $P_{O\_UE\_PUCCH}$, and may be defined to control a reception power spectrum density (PSD) by a BS. $P_{O\_PUCCH}$ is a cell-specific component, $P_{O\_UE\_PUCCH}$ is a UE-specific component, and $P_{O\_PUCCH}$ and $P_{O\_UE\_PUCCH}$ may be configured by a higher layer, for example, Radio Resource Control (RRC).

Detailed meaning of parameters shown in Equations 1 to 3 may refer to the 3 GPP TS 36.213 document.

It can be recognized that a UE belonging to the BS will attempt to transmit PUSCH and/or PUCCH using Tx power determined by Equations 1 to 3 through the serving cell (c) at the subframe (i). The BS may adjust parameters provided by higher layer signaling and/or dynamic signaling by a BS from among parameters of Equations 1 to 3, such that it may control UL transmission power of the UE.

[Operations of the UE and the Serving BS]

If a neighbor BS performs DL transmission while a UE of the serving BS performs UL transmission, some PUCCH regions transmitted by a UE of the serving BS may cause ICI to a PDCCH transmitted by the neighbor BS.

Figure 8:
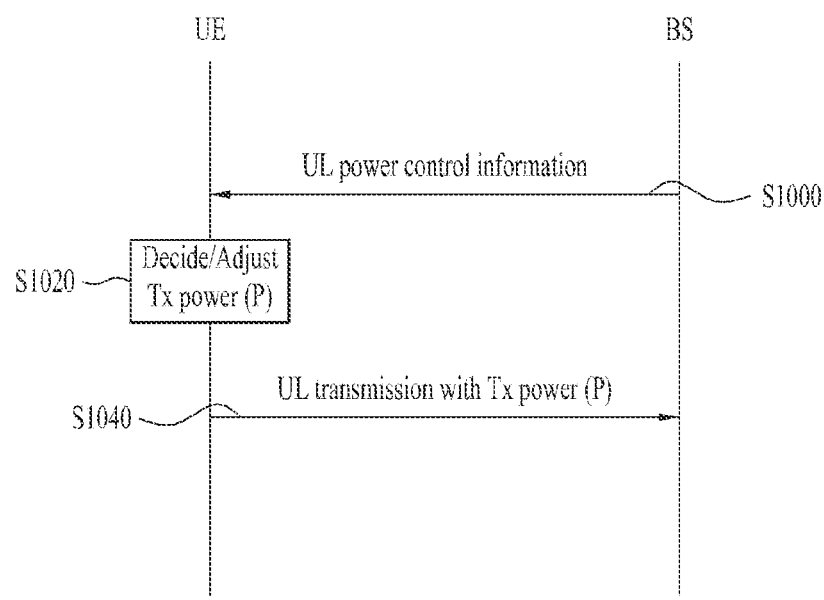
FIG. 8 is a flowchart illustrating the operations between a UE and a BS for ICI reduction according to an embodiment of the present invention.

FIG. 8 is a flowchart illustrating the operations between a UE and a BS for ICI reduction according to an embodiment of the present invention. Specifically, FIG. 8 exemplarily shows the operations of a BS and a UE of the interfering cell so as to reduce ICI for PDCCH transmission of the victim cell.

A PUCCH region, that causes interference to a PDCCH transmitted from a neighbor BS from among PUCCH regions of one UL subframe, is referred to as an overlapped PUCCH, and the remaining PUCCH region is referred to as a non-overlapped PUCCH. For example, assuming that synchronization between a subframe of the serving BS and a subframe of the neighbor BS is achieved and the neighbor BS uses the first two OFDM symbols of a DL subframe as a PDCCH region, an overlapped PUCCH that may cause interference to PUCCH transmission by a UE of the serving BS may correspond to the first two OFDM symbols of the subframe. In accordance with the embodiments of the present invention, a UE may adjust transmission (Tx) power of the interfering PUCCH indicating an overlapped PUCCH that may cause interference to a PDCCH of the neighbor BS.

In order to adjust Tx power of the overlapped PUCCH, the UE may receive at least one of the following message/ information from the serving BS in step S1000.

1) Tx power for the overlapped PUCCH
2) Tx power offset on the basis of the non-overlapped PUCCH
3) Power ratio of the overlapped PUCCH with respect to the non-overlapped PUCCH
4) $P_{O\_NOMINAL\_PUCCH}$ and/or $P_{O\_UE\_PUCCH}$ for each OFDM symbol of UL subframe For example, UL power control information transmitted as a higher layer message from the serving BS to the UE may be defined to carry $P_{O\_NOMINAL\_PUCCH}$ and/or $P_{O\_UE\_PUCCH}$ for each overlapped PUCCH or each non-overlapped PUCCH. In another example, the UL power control information may also be defined to carry $P_{O\_NOMINAL\_PUCCH}$ and/or $P_{O\_UE\_PUCCH}$ for each overlapped PUCCH or each non-overlapped PUCCH in a single subframe.

The UE may adjust UL transmission power of the overlapped PUCCH region using UL power control information received from the BS in step S1020. Such power adjustment may be applied to some OFDM symbol(s) colliding with DL transmission of a neighbor cell from among OFDM symbols of a UL subframe. For this purpose, the BS may inform an affiliated UE of a resource region in which the affiliated UE must adjust Tx power. For example, if the first three OFDM symbols of the UL subframe require power adjustment, the BS may inform the UE of the first three OFDM symbols of a UL subframe. In association with the symbols notified from the BS, the UE may transmit a PUCCH at power different from that of the remaining region of the UL subframe using at least one of the above three values 1) to 3) in step S1040. If a reference signal (RS) of the PUCCH is located in a resource region in which Tx power must be adjusted, the UE may preferably shift the RS position as a resource region in which Tx power adjustment is not requested in the slot or subframe.

A relative power down or zero power transmission for the overlapped PUCCH region to reduce PUCCH transmission interference of the higher PDCCH transmission of a heterogeneous subframe may cause throughput deterioration of PUCCH transmission. Therefore, compensation of the non-overlapped PUCCH is requested. For this purpose, it is preferable that the BS may perform different power control according to individual subframes. That is, as shown in FIG. 5, assuming that individual subframes are classified into a homogeneous subframe and a heterogeneous subframe according to link types of a neighbor BS, different power control information for each homogeneous/heterogeneous subframes may be provided to a UE. Therefore, the embodiment may provide a method for allowing the BS to provide the UE with different $P_{O\_PUCCH}$ values for each subframe, for each slot or for each OFDM symbol.

According to the embodiments, UL power control information transmitted to the UE through RRC signaling, for example, the UplinkPowerControl field may be defined to include a plurality of $P_{O\_NORMAL\_PUCCH}$ and/or $P_{O\_UE\_PUCCH}$ value(s) according to subframe properties. Irrespective of either the FDD frame configuration or the symmetric/asymmetric TDD frame configuration, $P_{O\_NORMAL\_PUCCH}$ and/or $P_{O\_UE\_PUCCH}$ values may be signaled to the UE according to subframe properties. In another example, $P_{O\_NORMAL\_PUCCH}$ and/or $P_{O\_UE\_PUCCH}$ values of individual subframe properties may be signaled by the BS supporting the asymmetric TDD subframe configuration according to subframe properties.

UE receives a plurality of $P_{O\_PUCCH}$ values. One $P_{O\_PUCCH}$ value from among the plurality of $P_{O\_PUCCH}$ values must be applied according to resource information to which each $P_{O\_PUCCH}$ value needs to be applied when PUCCH transmission power ($P_{PUCCH}$) is decided. $P_{O\_PUCCH}$ may be applied on the basis of a subframe. For example, assuming that the UE receives not only a bitmap of N bits being one-to-one mapped to N UL subframes, the UE may be configured to calculate $P_{PUCCH}$ in such a manner that a first $P_{O\_PUCCH}$ value is applied to a subframe corresponding to a bit of zero (0) from among the N bits and a second $P_{O\_PUCCH}$ value is applied to a subframe corresponding to a bit of 1.

If $P_{O\_PUCCH}$ is applied to the UE on the basis of a UL subframe, the UE may determine $P_{PUCCH}$ using Equation 3. However, whereas a conventional $P_{O\_PUCCH}$ is cell-specifically (in case of $P_{O\_NOMINAL\_PUCCH}$) or UE-specifically (in case of $P_{O\_UE\_PUCCH}$) signaled to be applied to a plurality of consecutive UL subframes, $P_{O\_PUCCH}$ according to the embodiment is different from $P_{O\_NOMINAL\_PUCCH}$ and/or $P_{O\_UE\_PUCCH}$ because $P_{O\_NOMINAL\_PUCCH}$ and/or $P_{O\_UE\_PUCCH}$ may be signaled to the UE according to UL subframe properties. If $P_{O\_NOMINAL\_PUCCH}$ and/or $P_{O\_UE\_PUCCH}$ may be provided to each slot or each OFDM, the UE may determine $P_{PUCCH}$ for each slot or for each OFDM symbol. The UE may determine $P_{PUCCH}$ for each slot or for each OFDM symbol after $P_{O\_NOMINAL\_PUCCH}$ and/or $P_{O\_UE\_PUCCH}$ are applied to each slot or each OFDM symbol as shown in Equation 3.

The above-mentioned embodiments may be applied to PUCCH or other UL physical channels (for example, PUSCH or PRACH). For example, assuming that the BS may inform the UE of the first two OFDM symbols of the UL subframe as a transmission power adjustment region, the UE may differently adjust transmission power of PUCCH, PUSCH and/or PRACH allocated to the corresponding region in a different way from PUCCH, PUSCH and/or PRACH allocated to the remaining regions other than the corresponding region. That is, the embodiments applied to PUCCH may be applied to at least one of PUSCH and PRACH. Therefore, according to the embodiments, the term 'PUCCH' may be replaced with PUSCH or PRACH. For example, referring to an example of PUSCH application, the UE may adjust transmission (Tx) power of the overlapped PUSCH causing interference to a PDCCH of a neighbor BS. For this purpose, the UE may receive at least one of the following message/information 1) to 4) from the serving BS.

1) Transmission power for the overlapped PUSCH
2) Transmission (Tx) power offset on the basis of the non-overlapped PUSCH
3) Power ratio of the non-overlapped PUSCH to the overlapped PUSCH
4) $P_{O\_NOMINAL\_PUSCH}$ and/or $P_{O\_UE\_PUSCH}$ for each OFDM symbol of UL subframe For example, uplink power control information transmitted from the serving BS to the UE through higher layer signaling may be defined to carry $P_{O\_NOMINAL\_PUCCH}$ and/or $P_{O\_UE\_PUCCH}$ for each overlapped PUSCH or for each non-overlapped PUSCH. In another example, UL power control information may be defined to carry $P_{O\_NOMINAL\_PUCCH}$ and/or $P_{O\_UE\_PUCCH}$ for the overlapped PUSCH or the non-overlapped PUSCH in only one subframe.

The UE may determine or adjust UL transmission power in the overlapped PUSCH region using UL power control information received from the serving BS, and may perform PUSCH transmission in the overlapped PUSCH region using the determined or adjusted transmission power.

In order to reduce interference of another UL physical channel on PUCCH transmission of a heterogeneous subframe, the power down or zero power transmission of the another UL physical channel may cause throughput deterioration of the another UL physical channel. Therefore, if power down or zero transmission of the overlapped UL physical channel is carried out, compensation of the non-overlapped UL physical channel is requested. For this purpose, in association with a PUCCH, the BS may perform different power control for each subframe on a UL physical channel as described above. Therefore, the embodiments may enable the BS to provide different UL transmission control information (for example, $P_{O\_PUSCH}$) for each subframe, for each slot, or for each OFDM symbol to the UE. In the same manner as in $P_{O\_PUCCH}$, UL power control information transmitted to the UE through RRC signaling (for example, the UplinkPowerControl field) may be defined to include a plurality of $P_{O\_NORMAL\_PUSCH}$ and/or $P_{O\_UE\_PUSCH}$ values according to subframe properties. Irrespective of either the FDD frame configuration or the symmetric/asymmetric TDD frame configuration, $P_{O\_NORMAL\_PUSCH}$ and/or $P_{O\_UE\_PUSCH}$ values may be signaled to the UE according to subframe properties. In another example, $P_{O\_NORMAL\_PUSCH}$ and/or $P_{O\_UE\_PUSCH}$ values of individual subframe properties may be signaled by the BS supporting the asymmetric TDD subframe configuration according to subframe properties.

UE receives a plurality of $P_{O\_PUSCH}$ values. One $P_{O\_PUSCH}$ value from among the plurality of $P_{O\_PUSCH}$ values must be applied according to resource information to which each $P_{O\_PUSCH}$ value needs to be applied when PUSCH transmission power ($P_{PUSCH}$) is decided.

If $P_{O\_PUSCH}$ is provided to the UE on a UL subframe basis, the UE may determine $P_{PUSCH}$ using Equation 1 in the case of transmitting a PUSCH without using a PUCCH. If PUCCH and PUSCH are simultaneously transmitted, $P_{PUSCH}$ may be determined using Equation 2. Whereas the conventional $P_{O\_PUSCH}$ is cell-specifically (in case of $P_{O\_NOMINAL\_PUSCH}$) or UE-specifically (in case of $P_{O\_UE\_PUSCH}$) to be applied to a plurality of neighbor UL subframes, $P_{O\_PUSCH}$ according to the embodiment is different from $P_{O\_NOMINAL\_PUSCH}$ and/or $P_{O\_UE\_PUSCH}$ because $P_{O\_NOMINAL\_PUSCH}$ and/or $P_{O\_UE\_PUSCH}$ may be signaled to the UE according to UL subframe properties. If $P_{O\_NOMINAL\_PUSCH}$ and/or $P_{O\_UE\_PUSCH}$ may be provided to each slot or each OFDM, the UE may determine $P_{PUSCH}$ for each slot or for each OFDM symbol after $P_{O\_NOMINAL\_PUSCH}$ and/or $P_{O\_UE\_PUSCH}$ are applied to each slot or each OFDM symbol as shown in Equation 1 or 2.

Meanwhile, the pathloss encountered in the heterogeneous subframe is different from the pathloss encountered in the homogeneous subframe. Therefore, compensation of the pathloss encountered in the heterogeneous subframe must be different from compensation of the pathloss encountered in the homogeneous subframe. The BS may provide a pathloss compensation factor $\alpha$ for each UL slot, for each UL slot or for each OFDM symbol to the UE according to UL subframe/slot/symbol properties. For example, it may transmit the resultant UplinkPowerControl field to the UE since the BS may include a plurality of alpha ($\alpha$) values in the UplinkPowerControl field transmitted in the form of the RRC message according to subframe properties. Irrespective of either the FDD frame configuration or the symmetric/asymmetric TDD frame configuration, $\alpha$ may be signaled to the UE according to subframe properties. In another example, a value for each subframe attribute may be signaled by the BS supporting the asymmetric TDD subframe configuration according to subframe properties.

The UE receives a plurality of $\alpha$ values, and one $\alpha$ value from among the plurality of $\alpha$ values must be applied according to resource information to be applied when transmission power of a UL channel is determined

[Operations Between a BS of the Interfering Cell and a BS of the Victim Cell]

The above-mentioned description has disclosed a method for reducing influence of UL transmission of the interfering cell that affects PDCCH transmission of the victim cell from the viewpoint of a BS and a UE. A method for reducing interference between neighbor cells from the viewpoint of a BS of the interfering cell and a BS of the victim cell will hereinafter be described with reference to the drawings.

Figure 9:
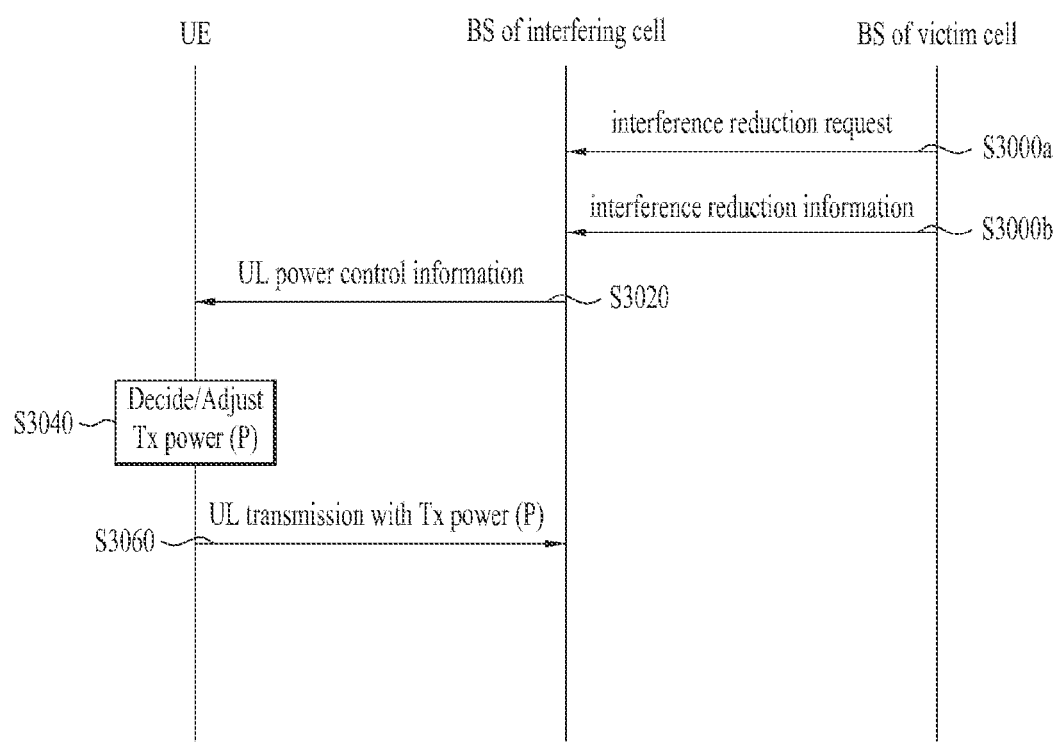
FIG. 9 is a flowchart illustrating the operations between a BS of an interfering cell and a BS of a victim cell to implement ICI reduction according to an embodiment of the present invention.

FIG. 9 is a flowchart illustrating the operations between a BS of an interfering cell and a BS of a victim cell to implement ICI reduction according to an embodiment of the present invention. Specifically, FIG. 9 is a flowchart illustrating the operations between a BS of the interfering cell and a BS of the victim cell so as to reduce ICI encountered during PDCCH transmission of the victim cell.

If a UE of a neighbor BS (or a nearby BS) performs UL transmission during the DL transmission of the BS, the above DL transmission may be interfered with the UL transmission. The BS (i.e., the BS of the victim cell) may command the neighbor BSs acting BSs of the interfering cell to transmit low transmission (Tx) power to a PUCCH region (i.e., the overlapped PUCCH) and/or a PUSCH region (i.e., the overlapped PUSCH) by a UE of the neighbor BS, wherein the PUCCH region and/or the PUSCH region may be transmitted at the same time as that of the PDCCH region transmitted by the BS of the interfering cell. In other words, the BS of the victim cell may command the BS of the interfering cell to transmit an interference reduction request in step S3000a. For this purpose, the BS of the victim cell may command the BS of the interfering cell to transmit at least one of the following information A to H in step S3000b.

A. UL/DL subframe configuration index
B. Number (L) of OFDM symbols for PDCCH
C. per resource block (RB) interference information on PDCCH
D. RB location information for PDCCH experiencing high interference level
E. Required power level for PUCCH per BS
F. Required power level for PUSCH per BS
G. Number (P) of antenna ports
H. Physical Layer Cell ID ($N^{Cell}_{ID}$)

Information D from among the above information A to H is resource allocation information of the victim cell, and may include at least one of 1) downlink bandwidth configuration ($N^{DL}_{RB}$), 2) RB level bitmap for $N^{DL}_{RB}$, 3) RB subset index for $N^{DL}_{RB}$, 4) Number ($N_{CCE}$) of Control Channel Elements (CCEs), and 5) Number ($N_{REG}$) of resource element groups (REGs).

In association with information E and F from among the above information A to H, a power level transmitted from the BS of the victim cell to the BS of the interfering cell may be a predetermined value differently applied according to the distance between BSs.

Information C from among the above information A to H may be configured in the form of an estimated noise and interference level or an invasion indicator, and may be provided to the BS of the interfering cell. The invasion indicator may indicate a positive (yes) or negative (no) value, and may indicate the presence or absence of validity of interference ranging from the interfering cell to the victim cell. If the information C indicates the presence of interference validity ranging from the interfering cell to the victim cell, the BS of the interfering cell may perform the above-mentioned embodiments for reducing interference caused by UL transmission of the interfering cell. For example, if the information C received from the BS of the victim cell indicates interference of a valid level, the BS of the interfering cell may transmit UL power control information reducing UL transmission power to the UE of the interfering cell in step S3020. The BS of the interfering cell may transmit UL power control information to the corresponding UE according to the embodiments shown in FIG. 8, and the UE may decide or adjust UL transmission power P according to the embodiments in step S3040, and may perform UL transmission at the transmission power P in step S3060.

The BS configured to perform DL transmission (i.e., a UE communicating with the BS of the interfering cell) may measure interference information of a PDCCH belonging to a heterogeneous subframe, and may feed back the measured information to the BS of the victim cell.

The above-mentioned embodiments have disclosed that a UL physical channel is configured to reduce interference encountered when UL physical channel (e.g., PUCCH, PUSCH, and/or PRACH) affects a PDCCH of the neighbor cell. However, the above-mentioned embodiments may also be used to reduce UL physical channel interference applied to other DL control channels (for example, PCIFICH, PHICH, etc.) of the neighbor cell. In the above-mentioned embodiments, PDCCH may be changed to PCIFICH or PHICH. In the above-mentioned embodiments, the PDCCH region may include at least one of PCIFICH and PHICH.

If the embodiments are applied to PCFICH, the BS of the victim cell performing DL transmission may transmit not only the above-mentioned information A to H but also at least one of the following information to the BS of the interfering cell performing UL transmission.

I. Slot number ($n_s$) in Radio Frame
J. System Frame Number ($n_f$)

If the embodiments are applied to PHICH, the BS of the victim cell may transmit not only the above-mentioned information A to H but also at least one of the following information I to N to the BS of the interfering cell performing UL transmission.

I. Slot number ($n_s$) in Radio Frame
J. System Frame Number ($n_f$)
K. PHICH group number ($N^{group}_{PHICH}$)
L. $N_g$
M. $m_i$
N. PHICH duration $N_g$ contained in the information L from among the information I to N is provided to the UE through higher layer signaling, and is denoted by $N_g \in \{1/6, 1/2, 1, 2\}$. $m_i$ contained in the information M from among the information I to N is a factor of the TDD frame structure, and is predefined for each UL-DL configuration in association with the subframe i. For example, $m_i$ may be defined as follows.

TABLE 3

| Uplink-downlink | Subframe number i | | | | | | | | | |
|---|---|---|---|---|---|---|---|---|---|---|
| configuration | 0 | 1 | 2 | 3 | 4 | 5 | 6 | 7 | 8 | 9 |
| 0 | 2 | 1 | — | — | — | 2 | 1 | — | — | — |
| 1 | 0 | 1 | — | — | 1 | 0 | 1 | — | — | 1 |
| 2 | 0 | 0 | — | 1 | 0 | 0 | 0 | — | 1 | 0 |
| 3 | 1 | 0 | — | — | — | 0 | 0 | 0 | 1 | 1 |
| 4 | 0 | 0 | — | — | 0 | 0 | 0 | 0 | 1 | 1 |
| 5 | 0 | 0 | — | 0 | 0 | 0 | 0 | 0 | 1 | 0 |
| 6 | 1 | 1 | — | — | — | 1 | 1 | — | — | 1 |

Control information received from the BS of the victim cell to the BS of the interfering cell for PUCCH power control may further include PUSCH and/or PRACH control information.

In the above-mentioned embodiments, the BS operation may be interpreted as the operations of a higher layer, a network, and (E)UTRAN, etc. Likewise, the operation expressed as the higher layer operation may be interpreted as the operation of BS, network, or (E)UTRAN.

Figure 10:
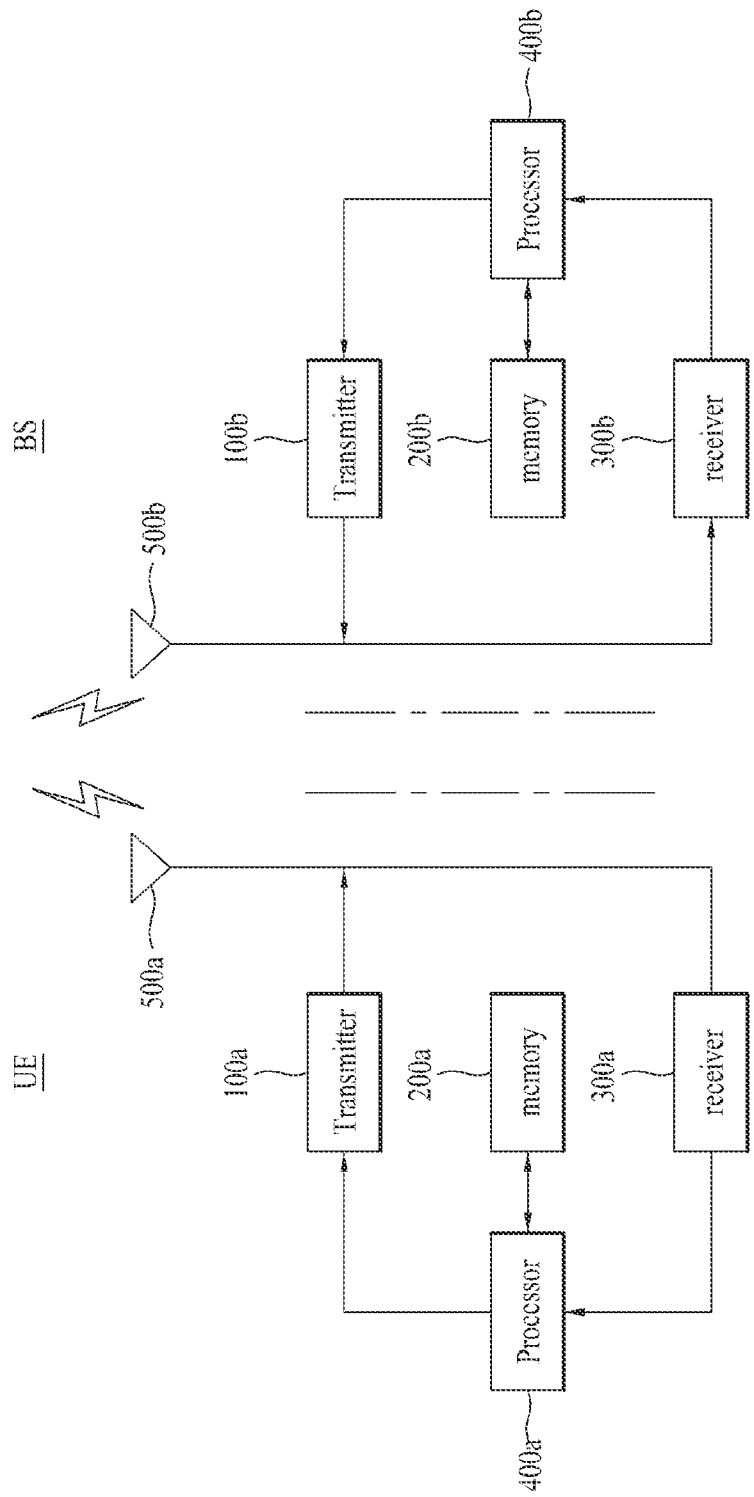
FIG. 10 is a block diagram illustrating components of a user equipment (UE) and a base station (BS) which implement the present invention.

FIG. 10 is a block diagram of a UE and a BS for implementing the present invention.

The UE serves as a transmitting device on the uplink and as a receiving device on the downlink. In contrast, the BS may serve as a receiving device on the uplink and as a transmitting device on the downlink.

The UE and the BS include antennas 500a and 500b for receiving information, data, signals, and/or messages, transmitters 100a and 100b for transmitting messages by controlling the antennas 500a and 500b, receivers 300a and 300b for receiving messages by controlling the antennas 500a and 500b, and memories 200a and 200b for storing information associated with communication in the wireless communication system. The UE and the BS further include processors 400a and 400b, respectively, which are adapted to perform the present invention by controlling the components of the UE and the BS, such as the transmitters 100a and 100b, the receivers 300a and 300b, and the memories 200a and 200b. The transmitter 100a, the memory 200a, the receiver 300a, and the processor 400a in the UE may be configured as independent components on separate chips or their separate chips may be incorporated into a single chip. Likewise, the transmitter 100b, the memory 200b, the receiver 300b, and the processor 400b in the BS may be configured as independent components on separate chips or their separate chips may be incorporated into a single chip. The transmitter and the receiver may be configured as a single transceiver in the UE or the BS.

The memories 200a and 200b may store programs required for signal processing and controlling of the processors 400a and 400b and temporarily store input and output information. The memories 200a and 200b may store predefined codebooks with respect to each rank. Each of the memories 200a and 200b may be implemented into a flash memory-type storage medium, a hard disc-type storage medium, a multimedia card micro-type storage medium, a card-type memory (e.g. a Secure Digital (SD) or eXtreme Digital (XS) memory), a Random Access Memory (RAM), a Read-Only Memory (ROM), an Electrically Erasable Programmable Read-Only Memory (EEPROM), a Programmable Read-Only Memory (PROM), a magnetic memory, a magnetic disc, or an optical disk.

The antennas 500a and 500b transmit signals generated from the transmitters 100a and 100b to the outside, or transfer radio signals received from the outside to the receivers 300a and 300b. The antennas 500a and 500b may be referred as antenna ports. Each antenna port may correspond to one physical antenna or may be configured into a combination of more than one physical antenna element. In either case, the signal transmitted from each antenna port is not designed to be further deconstructed by the UE receiver (300a). The transmitted reference signal corresponding to a given antenna port defines the antenna port from the point of the UE, and enables the UE to derive a channel estimation for that antenna port, regardless of whether it represents a single radio channel from one physical antenna or a composite channel from a plurality of physical antenna elements together comprising the antenna port. If the transmitters 100a and 100b and/or the receivers 300a and 300b support a Multiple Input Multiple Output (MIMO) function using a plurality of antennas, each of them may be connected to two or more antennas.

The processors 400a and 400b generally provide overall control to the modules of the UE and the BS. Especially, the processors 400a and 400b may carry out a control function for performing the present invention, a Medium Access Control (MAC) frame variable control function based on service characteristics and a propagation environment, a power saving mode function for controlling idle-mode operations, a handover function, and an authentication and encryption function. The processors 400a and 400b may also be referred to as controllers, microcontrollers, microprocessors, microcomputers, etc. The processors 400a and 400b may be configured in hardware, firmware, software, or their combination. In a hardware configuration, the processors 400a and 400b may be provided with one or more Application Specific Integrated Circuits (ASICs), Digital Signal Processors (DSPs), Digital Signal Processing Devices (DSPDs), Programmable Logic Devices (PLDs), and/or Field Programmable Gate Arrays (FPGAs), for implementing the present invention. In a firmware or software configuration, firmware or software may be configured to include a module, a procedure, a function, etc. for performing functions or operations of the present invention. This firmware or software may be provided in the processors 400a and 400b, or may be stored in the memories 200a and 200b and driven by the processors 400a and 400b.

The transmitters 100a and 100b perform predetermined coding and modulation for signals and/or data, which are scheduled by the processors 400a and 400b or schedulers connected to the processors 400a and 400b and transmitted to the outside, and then transfer the modulated signals and/or data to the antennas 500a and 500b. For example, the transmitters 100a and 100b convert a transmission data stream to K layers by demultiplexing, channel coding, modulation, etc. The K layers are transmitted through the antennas 500a and 500b after being processed in transmission processors of the transmitters 100a and 100b. The term "layer" may indicate an information input path that is input to the precoder, and may be referred to as a transmission layer, a stream, a transmission stream, a data stream, etc. One transport block (TB) may be encoded into one codeword. The transmitters (100a, 100b) may transmit one or more codewords. Each codeword may be transmitted as one or more layers to the receiver.

The signal processing procedure of the receivers 300a and 300b is the reverse of the signal processing procedure of the transmitters. Specifically, the receivers 300a and 300b perform decoding and demodulation of wireless signals received from the outside through the antennas 500a and 500b and deliver the resulting signals to the corresponding processors 400a and 400b. Each of the antennas 500a and 500b connected to the receivers 300a and 300b may include $N_r$ reception antennas. Each of the signals received through the reception antennas is reconstructed into a base band signal and is then reconstructed into a data stream, which was originally intended to be transmitted by the transmitters 100a and 100b, through multiplexing and MIMO demodulation.

The transmitters 100a and 100b and the receivers 300a and 300b of the UE and the BS may be configured in different manners depending on the procedu'res of processing transmitted signals and received signals. Modules including the transmitters 100a and 100b, the receivers 300a and 300b and the antennas 500a and 500b are referred to as radio frequency (RF) units.

The UE receiver 300a of the embodiments may receive UL power control information by the BS. The UE receiver 300a may receive information indicating at least one of the overlapped UL channel section that causes valid interference to DL transmission of the neighbor cell and the non-overlapped UL channel section that does not cause valid interference to DL transmission of the neighbor cell.

The UE processor 400a may control the operations carried by the UE according to the embodiments. Specifically, the UE processor 400a may decide transmission (Tx) power of the overlapped UL channels (e.g., PUCCH, PUSCH, and/or PRACH) that cause interference to DL control channels (e.g., PDCCH, PCFICH and/or PHICH) of the neighbor cell on the basis of UL power control information transmitted by the BS. The UL power control information may include a parameter for determining Tx power of the overlapped UL channel and/or a parameter for deciding Tx power of the non-overlapped UL channel. For example, in case of PUCCH, the UL control information may include $P_{O\_NOMINAL\_PUCCH}$ and/or $P_{O\_UE\_PUCCH}$ of the overlapped PUCCH and $P_{O\_NOMINAL\_PUCCH}$ and/or $P_{O\_UE\_PUCCH}$ of the non-overlapped PUCCH. In another example, in case of PUSCH, the UL control information may include $P_{O\_NOMINAL\_PUSCH}$ and/or $P_{O\_UE\_PUSCH}$ of the overlapped PUSCH and $P_{O\_NOMINAL\_PUSCH}$ and/or $P_{O\_UE\_PUSCH}$ of the non-overlapped PUSCH. In case of PUSCH, UL control information may include the pathloss compensation factor (α) of the overlapped PUSCH and the pathloss compensation factor (α) of the non-overlapped PUSCH. The UL control information may be transmitted from the BS to the UE per subframe, per slot, or per OFDM symbol.

The UE processor 400a may determine power for transmitting the UL channel in the overlapped UL channel section using power control parameters of the overlapped UL channel, and may determine power for transmitting the UL channel in the non-overlapped UL channel section using power control parameters of the non-overlapped UL channel. The UE processor 400a may determine Tx power of the UL channel using any one of Equations 1 to 3.

The UE processor 400a may control the UE transmitter 100a in such a manner that the UE transmitter 100a transmits the UL channel at power, determined based on the power control parameter for the overlapped UL channel, within the overlapped UL channel section. The UE processor 400a may control the UE transmitter 100a in such a manner that the UE transmitter 100a transmits the UL channel at power, determined based on the power control parameter for the non-overlapped UL channel, within the non-overlapped UL channel section.

The BS processor 400b of the embodiments may control the operations carried out by the BS or the higher layer. The BS processor 400b may generate UL power control information according to any one of the embodiments. The BS processor 400b may control the BS transmitter 100b in such a manner that the BS transmitter 100b transmits UL power control information to the UE according to any one of the embodiments. The BS processor 400b may recognize that the UE processor 400a will attempt to determine Tx power of the overlapped UL channel section and Tx power of the non-overlapped UL channel section using the UL power control information. The BS processor 400b may control the BS receiver 300b in such a manner that the BS processor 400b may receive the UL channel transmitted by the UE transmitter 100a at power determined based on the UL power control information.

The BS processor 400b may determine or adjust parameter(s) for controlling Tx power of the UL channel for the UE on the basis of reception intensity of the UL channel received by the BS receiver 300b. In this case, the BS processor 400b may consider interference that the UL channel affects to DL transmission of the neighbor cell. Information indicating whether interference applied from the UL channel to DL transmission of the neighbor cell will be considered for the UL power control by the BS processor 400a may be decided on the basis of a request from the BS of the neighbor cell.

In the embodiments, the BS processor of the victim cell may control the BS transmitter of the victim cell in such a manner that at least one of the above information A to N is transmitted to the BS of the interfering cell. The BS transmitter of the victim cell may control Tx power of the UL channel of the UE located in the interfering cell on the basis of interference reduction request or interference reduction information from the BS of the victim cell. For this purpose, the BS processor of the interfering cell may generate UL power control information according to any one of the embodiments, and control the transmitter of the interfering cell to transmit the UL power control information to the UE of the interfering cell.

According to the embodiments, the BS may freely configure the UL/DL frame/subframe.

According to the embodiments, although the BS may freely configure the UL/DL frame/subframe, UL transmission time-frequency resources colliding with DL transmission of the neighbor cell may be removed or reduced, such that ICI (Inter-Cell Interference) of the neighbor cells can be reduced. Therefore, reliability of UL and/or DL transmission is increased so that communication throughput of the TDD asymmetric system can be improved.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The embodiments of the present invention can be applied to a BS, a UE, or other communication devices in a wireless communication system.

The invention claimed is:

1. An uplink power control method for use in a user equipment (UE) of a Time Division Duplex (TDD) system, the method comprising:
   receiving, by the UE, subframe type configuration information;
   receiving, by the UE, uplink (UL) power control information;
   determining, by the UE, a transmission (Tx) power of a UL channel based on the UL power control information and the subframe type configuration information; and
   transmitting, by the UE, the UL channel at the Tx power,
   wherein the subframe configuration information indicates which subframe is a first type of subframe or a second type of subframe,
   wherein the UL power control information includes:
      a first parameter used for the first type of subframe; and
      a second parameter used for the second type of subframe,
   wherein the Tx power is determined using the first parameter when the UL channel is transmitted in the first type of subframe,
   wherein the Tx power is determined using the second parameter when the UL channel is transmitted in the second type of subframe,
   wherein the first type of subframe is a UL homogeneous time duration in which both a communication link type of a serving cell of the UE and a communication link type of a neighbor cell are UL, and
   wherein the second type of subframe is a UL heterogeneous time duration in which the communication link type of the serving cell is UL and the communication link type of the neighbor cell is downlink (DL).

2. The method according to claim 1, wherein the first type of subframe is a subframe where the UL channel transmitted by the UE causes interference toward a DL control channel transmitted in the neighbor cell other than the serving cell in which the UE is located.

3. An uplink power control method for use in a base station (BS) of a Time Division Duplex (TDD) system, the method comprising:
   transmitting, by the BS to a user equipment (UE), subframe type information;
   transmitting, by the BS to the UE, uplink (UL) power control information; and
   receiving, by the BS, a UL channel transmitted by the UE at a transmission (Tx) power, wherein the subframe configuration information indicates which subframe is a first type of subframe or a second type of subframe,
wherein the UL power control information includes:
a first parameter for the first type of subframe, and
a second parameter for the second type of subframe,
wherein the Tx power is determined using the first parameter when the UL channel is transmitted by the UE in the first type of subframe,
wherein the Tx power is determined using the second parameter when the UL channel is transmitted by the UE in the second type of subframe,
wherein the first type of subframe is a UL homogeneous time duration in which a communication link type of a serving cell of the UE and a communication link type of a neighbor cell are UL, and
wherein the second type of subframe is a UL heterogeneous time duration in which the communication link type of the serving cell is UL and the communication link type of the neighbor cell is downlink (DL).

4. The method according to claim 3, wherein the first type of subframe is a subframe where the UL channel transmitted to the BS of the serving cell causes interference toward the DL control channel transmitted by a BS of the neighbor cell.

5. A user equipment (UE) for use in a Time Division Duplex (TDD) system comprising:
a transmitter;
a receiver; and
a processor configured to:
control the transmitter and the receiver;
control the receiver to receive subframe type configuration information;
control the receiver to receive uplink (UL) power control information; and
determine a transmission (Tx) power of a UL channel based on the UL power control information and the subframe type configuration information,
wherein the subframe configuration information indicates which subframe is a first type of subframe or a second type of subframe,
wherein the UL power control information includes a first parameter used for the first type of subframe and a second parameter used for the second type of subframe,
wherein the Tx power is determined using the first parameter when the UL channel is transmitted in the first type of subframe,
wherein the Tx power is determined using the second parameter when the UL channel is transmitted in the second type of subframe,
wherein the first type of subframe is a UL homogeneous time duration in which both a communication link type of a serving cell of the UE and a communication link type of a neighbor cell are UL, and
wherein the second type of subframe is a UL heterogeneous time duration in which the communication link type of the serving cell is UL and the communication link type of the neighbor cell is downlink (DL).

6. The UE according to claim 5, wherein the first type of subframe is a subframe where the UL channel transmitted by the UE causes interference toward a DL control channel transmitted in the neighbor cell other than the serving cell in which the UE is located.

7. A base station (BS) for use in a Time Division Duplex (TDD) system comprising:
a transmitter;
a receiver; and
a processor configured to:
control the transmitter and the receiver;
control the transmitter to transmit subframe type information to a user equipment (UE);
control the transmitter to transmit, to the UE, uplink (UL) power control information; and
control the receiver to receive a UL channel transmitted by the UE at a transmission (Tx) power,
wherein the subframe configuration information indicates which subframe is a first type of subframe or a second type of subframe,
wherein the UL power control information includes a first parameter used for the first type of subframe and a second parameter used for the second type of subframe,
wherein the Tx power is determined using the first parameter when the UL channel is transmitted by the UE in the first type of subframe,
wherein the Tx power is determined using the second parameter when the UL channel is transmitted by the UE in the second type of subframe,
wherein the first type of subframe is a UL homogeneous time duration in which both a communication link type of a serving cell of the UE and a communication link type of a neighbor cell are UL, and
wherein the second type of subframe is a UL heterogeneous time duration in which the communication link type of the serving cell is UL and the communication link type of the neighbor cell is downlink (DL).

8. The BS according to claim 7, wherein the first type of subframe is a subframe where the UL channel transmitted to the BS of the serving cell causes interference toward the DL transmitted by a BS of the neighbor cell.

9. The method according to claim 2, wherein the Tx power determined using the first parameter is lower than the Tx power determined using the second parameter.

10. The method according to claim 4, wherein the Tx power determined using the first parameter is lower than the Tx power determined using the second parameter.

11. The UE according to claim 6, wherein the Tx power determined using the first parameter is lower than the Tx power determined using the second parameter.

12. The BS according to claim 8, wherein the Tx power determined using the first parameter is lower than the Tx power determined using the second parameter.

* * * * *